United States Patent
Wang et al.

(10) Patent No.: US 10,613,902 B2
(45) Date of Patent: Apr. 7, 2020

(54) GPU RESOURCE ALLOCATION METHOD AND SYSTEM

(71) Applicant: HUAWEI TECHNOLOGIES CO., LTD., Shenzhen, Guangdong (CN)

(72) Inventors: Cong Wang, Beijing (CN); Xusheng Zhan, Beijing (CN); YunGang Bao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 15/846,394

(22) Filed: Dec. 19, 2017

(65) Prior Publication Data
US 2018/0107519 A1 Apr. 19, 2018

Related U.S. Application Data

(63) Continuation of application No. PCT/CN2016/083315, filed on May 25, 2016.

(30) Foreign Application Priority Data

Jun. 19, 2015 (CN) .......................... 2015 1 0346334

(51) Int. Cl.
G06F 9/46 (2006.01)
G06F 9/50 (2006.01)
(Continued)

(52) U.S. Cl.
CPC .......... *G06F 9/5011* (2013.01); *G06F 9/4831* (2013.01); *G06F 9/505* (2013.01); *G06T 1/20* (2013.01); *G06T 1/60* (2013.01)

(58) Field of Classification Search
CPC ......... G06F 9/45558; G06F 2009/4557; G06F 2009/45591
See application file for complete search history.

(56) References Cited

U.S. PATENT DOCUMENTS

| 7,401,112 | B1 * | 7/2008 | Matz ..................... G06F 9/5038 379/265.02 |
| 2008/0109810 | A1 | 5/2008 | Pronovost et al. |
| 2017/0139751 | A1 * | 5/2017 | Chen ..................... G06F 9/5016 |

FOREIGN PATENT DOCUMENTS

| CN | 102541640 A | 7/2012 |
| CN | 103617088 A | 3/2014 |
| CN | 103631660 A | 3/2014 |

OTHER PUBLICATIONS

Jayvant Anantpur et al., "PRO: Progress Aware GPU Warp Scheduling Algorithm," 2015 IEEE 29th International Parallel and Distributed Processing Symposium, Jul. 20, 2015, pp. 979-988.
(Continued)

*Primary Examiner* — Camquy Truong
(74) *Attorney, Agent, or Firm* — Conley Rose, P.C.

(57) ABSTRACT

A GPU resource allocation method and system relate to the field of computer technologies. A global logic controller determines a to-be-distributed kernel program in a kernel status register table; searches an SM status register table for an SM capable of running at least one entire thread block; when the SM capable of running at least one entire block is not found, searches the SM status register table for a first SM, where the first SM is an SM capable of running at least one thread warp; and when the first SM is found, distributes a block from the to-be-distributed kernel program to the first SM; or when the first SM is not found, searches for a second SM and then distributes the block from the to-be-distributed kernel program to the second SM. The GPU resource allocation method and system are applicable to GPU resource allocation.

18 Claims, 8 Drawing Sheets

(51) Int. Cl.
*G06F 9/48* (2006.01)
*G06T 1/20* (2006.01)
*G06T 1/60* (2006.01)

(56) References Cited

OTHER PUBLICATIONS

Office Action, dated Jan. 16, 2019, in Chinese Application No. 201510346334.9 (11 pp.).
Ivan Tanasic et al., "Enabling Preemptive Multiprogramming on GPUs," IEEE 2014, 12 pages.
Ping Xiang et al., "Warp-Level Divergence in GPUs: Characterization, Impact, and Mitigation," IEEE 2014, 12 pages.
NVIDIA, "Programming guide—CUDA C Programming Guide," Dec. 2017, 301 pages.
International Search Report dated Sep. 29, 2016 in corresponding International Patent Application No. PCT/CN2016/083315, 8 pages.
Written Opinion dated Sep. 29, 2016 in corresponding International Patent Application No. PCT/CN2016/083315, 4 pages.
International Search Report dated Aug. 29, 2016 in corresponding International Patent Application No. PCT/CN2016/083315.

\* cited by examiner

GPU RESOURCE ALLOCATION METHOD AND SYSTEM

CROSS-REFERENCE TO RELATED APPLICATIONS

This application is a continuation of International Application No. PCT/CN2016/083315, filed on 25 May 2016, which claims priority to Chinese Patent Application No. 201510346334.9, filed on Jun. 19, 2015. The disclosures of the aforementioned applications are hereby incorporated by reference in their entireties.

TECHNICAL FIELD

The present disclosure relates to the field of computer technologies, and in particular, to a GPU (Graphics Processing Unit) resource allocation method and system.

BACKGROUND

With development of general GPU (Graphics Processing Unit) technologies, a GPU not only can process image load but also can process a particular type of general program. Currently, when multiple different kernel programs need to access a GPU, generally, the kernel programs requesting to access the GPU access the GPU one by one in a serialized manner according to a time order of sending requests. If a kernel program having a very long delay is occupying a GPU, when a kernel program having a higher priority needs to access the GPU, the kernel program having the higher priority can access the GPU only when the kernel program that is accessing the GPU and a kernel program that is waiting to access the GPU have completed running and then SM (streaming multiprocessor) resources in the GPU are released. Consequently, the kernel program having the higher priority is not responded to in a timely manner and service quality is affected.

To prevent a kernel program having a long delay from exclusively occupying the SM resources in the GPU for a long time, when a kernel program having a high priority needs to access the GPU, an idle SM may be searched for. When an idle SM is found, the kernel program having the high priority is distributed to the idle SM for running. However, if the GPU has no idle SM, the kernel program having the high priority can start to run only when an idle SM occurs in the GPU. Consequently, the kernel program having the high priority is not responded to in a timely manner.

SUMMARY

Embodiments of the present invention provide a GPU resource allocation method and system, so as to resolve a problem that a kernel program having a high priority is not responded to in a timely manner.

To achieve the foregoing, the embodiments of the present invention use the following technical solutions:

According to a first aspect, an embodiment of the present invention provides a graphics processing unit (GPU) resource allocation method, where the method is applied to a GPU resource allocation system, the system includes a global logic controller and at least two streaming multiprocessors (SMs) capable of communicating with the global logic controller, and the method includes:

determining, by the global logic controller, a to-be-distributed kernel program in a kernel status register table, where the kernel status register table includes a priority of each kernel program that does not complete running and a quantity of undistributed thread blocks in each kernel program that does not complete running, and wherein the to-be-distributed kernel program is a kernel program whose priority is highest in the kernel status register table and in which a quantity of undistributed thread blocks is not zero;

searching, by the global logic controller, an SM status register table for an SM capable of running at least one entire thread block, where the SM status register table includes a quantity of remaining resources in each SM and a highest priority of a thread block in each SM;

searching, by the global logic controller, the SM status register table for a first SM when the SM capable of running at least one entire thread block is not found, where the first SM is an SM capable of running at least one thread warp; and distributing, by the global logic controller, the thread block from the to-be-distributed kernel program to the first SM when the first SM is found; or searching, by the global logic controller, for a second SM when the first SM is not found, where a highest priority of a thread block in the second SM is lower than the priority of the to-be-distributed kernel program; and distributing, by the global logic controller, the thread block from the to-be-distributed kernel program to the second SM when the second SM is found.

In a first possible embodiment, with reference to the first aspect, after the searching, by the global logic controller, an SM status register table for an SM capable of running at least one entire block, the method further includes:

determining, by the global logic controller, a first quantity when the SM capable of running at least one thread entire block is found, where the first quantity is a quantity of thread blocks that can be actually run by the SM capable of running at least one thread entire block; and when the quantity of the undistributed thread blocks in the to-be-distributed kernel program is greater than the first quantity, distributing the first quantity of thread blocks from the to-be-distributed kernel program to the SM capable of running at least one thread entire block; or when the quantity of the undistributed thread blocks in the to-be-distributed kernel program is less than or equal to the first quantity, distributing all the undistributed thread blocks from the to-be-distributed kernel program to the SM capable of running at least one thread entire block.

In a second possible embodiment, with reference to the first possible embodiment in the first aspect, after the distributing, by the global logic controller, the block from the to-be-distributed kernel program to the second SM, the method further includes:

determining, by a second SM logic controller, a thread block having a highest priority in a thread block status register table, where the second SM logic controller is an SM logic controller in the second SM, and the thread block status register table includes a priority of each thread block distributed to the second SM;

searching, by the second SM logic controller, for a current idle hardware warp; and distributing, by the second SM logic controller, a warp from the thread block having the highest priority to the idle hardware warp when the second SM logic controller determines that the idle hardware warp is capable of running a thread warp and does not receive a thread block having a higher priority.

In a third possible embodiment, with reference to the first aspect or any one of the foregoing possible embodiments of the first aspect, the SM status register table includes a quantity of remaining registers, a quantity of remaining hardware warps, and remaining shared memory space of each SM, and the first SM is an SM in which a quantity of remaining registers is greater than a quantity of registers required for running a thread warp, in which a quantity of remaining hardware warps is greater than a quantity of hardware warps required for running a thread warp, and in which remaining shared memory space is greater than shared memory space required for running a thread warp.

In a fourth possible embodiment, with reference to the third possible embodiment of the first aspect, after the distributing, by the second SM logic controller, a thread warp from the thread block having the highest priority to the hardware warp when the second SM logic controller determines that the idle hardware warp is capable of running a thread warp and does not receive a thread block having a higher priority, the method further includes:

instructing, by the second SM logic controller, the global logic controller to update the quantity of remaining registers, the quantity of remaining thread warps, and the remaining shared memory space of the second SM when the second SM logic controller determines that the second SM has a thread warp that has completed running; and determining, by the second SM logic controller, a highest priority of a thread block that does not complete running in the second SM and instructing the global logic controller to update the highest priority of the thread block in the second SM in the SM status register table, when the second SM logic controller determines that a thread block to which the thread warp that has completed running belongs does not have a thread warp that does not complete running.

According to a second aspect, an embodiment of the present invention provides a graphics processing unit GPU resource allocation system, where the system includes a global logic controller and at least two streaming multiprocessors SMs capable of communicating with the global logic controller, and the global logic controller includes: a first determining unit, a first search unit, and a first distribution unit, where the first determining unit is configured to determine a to-be-distributed kernel program in a kernel status register table, where the kernel status register table includes a priority of each kernel program that does not complete running and a quantity of undistributed thread blocks in each kernel program that does not complete running, and the to-be-distributed kernel program is a kernel program whose priority is highest in the kernel status register table and in which a quantity of undistributed thread blocks is not zero;

the first search unit is configured to: search an SM status register table for an SM capable of running at least one entire thread block, where the SM status register table includes a quantity of remaining resources in each SM and a highest priority of a thread block in each SM; and when the SM capable of running at least one entire thread block is not found, search the SM status register table for a first SM, where the first SM is an SM capable of running at least one thread warp;

the first distribution unit is configured to: when the first search unit finds the first SM, distribute the thread block from the to-be-distributed kernel program to the first SM;

the first SM is configured to run the thread block that is from the to-be-distributed kernel program and that is distributed by the first distribution unit;

the first search unit is further configured to: when the first SM is not found, search for a second SM, where a highest priority of a thread block in the second SM is lower than the priority of the to-be-distributed kernel program;

the first distribution unit is further configured to: when the first search unit finds the second SM, distribute the thread block from the to-be-distributed kernel program to the second SM; and the second SM is configured to run the thread block that is from the to-be-distributed kernel program and that is distributed by the first distribution unit.

In a first possible embodiment, with reference to the second aspect, the first determining unit is further configured to: when the first search unit finds the SM capable of running at least one entire thread block, determine a first quantity, where the first quantity is a quantity of thread blocks that can be actually run by the SM capable of running at least one entire thread block;

the first distribution unit is further configured to: when the quantity of the undistributed thread blocks in the to-be-distributed kernel program is greater than the first quantity, distribute the first quantity of thread blocks from the to-be-distributed kernel program to the SM capable of running at least one entire thread block; or when the quantity of the undistributed thread blocks in the to-be-distributed kernel program is less than or equal to the first quantity, distribute all the undistributed thread blocks from the to-be-distributed kernel program to the SM capable of running at least one entire thread block; and the SM capable of running at least one entire thread block is configured to run the thread block that is from the to-be-distributed kernel program and that is distributed by the first distribution unit.

In a second possible embodiment, with reference to the first possible embodiment of the second aspect, the second SM includes a second determining unit, a second search unit, and a second distribution unit, where the second determining unit is configured to determine a thread block having a highest priority in a thread block status register table, where the thread block status register table includes a priority of each thread block distributed to the second SM;

the second search unit is configured to search for a current idle hardware warp; and the second distribution unit is configured to: when it is determined that the idle hardware warp is capable of running a thread warp and a thread block having a higher priority is not received, distribute a thread warp from the thread block having the highest priority to the idle hardware warp.

In a third possible embodiment, with reference to the second aspect or any one of the foregoing possible embodiments of the second aspect, the SM status register table includes a quantity of remaining registers, a quantity of remaining hardware warps, and remaining shared memory space of each SM, and the first SM is an SM in which a quantity of remaining registers is greater than a quantity of registers required for running a thread warp, in which a quantity of remaining hardware warps is greater than a quantity of hardware warps required for running a thread warp, and in which remaining shared memory space is greater than shared memory space required for running a thread warp.

In a fourth possible embodiment, with reference to the third possible embodiment of the second aspect, the second SM further includes a notification unit, where the notification unit is configured to: when it is determined that the second SM has a thread warp that has completed running, instruct the global logic controller to update the quantity of remaining registers, the quantity of remaining thread warps, and the remaining shared memory space of the second SM; and when it is determined that a thread block to which the thread warp that has completed running belongs does not have a thread warp that does not complete running, determine a highest priority of a thread block that does not complete running in the second SM and instruct the global logic controller to update the highest priority of the thread block in the second SM in the SM status register table.

In the GPU resource allocation method and system provided in the embodiments of the present invention, a global logic controller determines a to-be-distributed kernel program in a kernel status register table; searches an SM status register table for an SM capable of running at least one entire thread block; when the SM capable of running at least one thread block is not found, continues to search for a first SM capable of running at least one thread warp and distributes a thread block from the to-be-distributed kernel program to the first SM; and when the first SM is not found, distributes the thread block from the to-be-distributed kernel program to a second SM. In the prior art, only when a GPU has an idle SM, a thread block in a kernel program having a high priority can be distributed to the SM. Consequently, the kernel program having the high priority is not responded to in a timely manner. By comparison, in the embodiments of the present invention, when an SM capable of running at least one thread block is not found, a first SM capable of running at least one thread warp is searched for instead of waiting for another kernel program to release resources. Because the thread warp is smaller than the thread block, completion of running of the thread warp is faster than completion of running of the thread block, and the SM capable of running at least one thread warp is found more easily. After the SM capable of running at least one thread warp is found, a thread block in a to-be-distributed kernel program may be distributed to the first SM without waiting for a kernel program having a low priority to complete running a thread block. Alternatively, when the first SM capable of running at least one thread warp is not found, the thread block in the to-be-distributed kernel program is distributed to a second SM, thereby shortening a waiting time for thread block distribution and increasing a response speed of the kernel program having the high priority.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
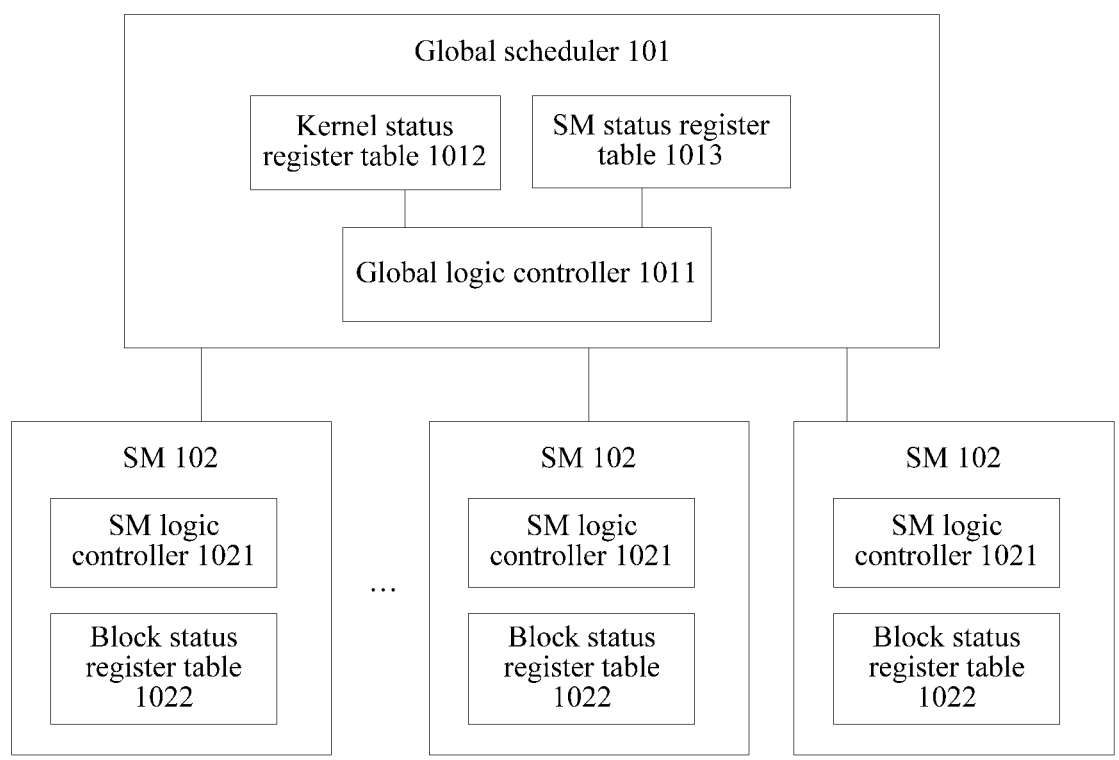
FIG. 1 is a schematic diagram of a logical structure of a GPU resource allocation system according to an embodiment of the present invention.

An embodiment of the present invention is applied to a GPU resource allocation system. As shown in FIG. 1, the system includes a global scheduler 101 and at least two SMs 102 capable of communicating with the global scheduler 101.

The global scheduler 101 includes: a global logic controller 1011, a kernel status register table 1012, and an SM status register table 1013.

The SM 102 includes: an SM logic controller 1021 and a thread block status register table 1022.

The global scheduler 101 is configured to distribute a kernel program to the SM 102 for running.

The global logic controller 1011 is configured to distribute, according to the kernel status register table 1012 and the SM status register table 1013, the kernel program to the SM 102 by using a thread block or a thread warp as a granularity.

It should be noted that in this embodiment of the present invention, a kernel program is a program capable of running on a GPU, a kernel program includes at least two thread blocks, a thread block includes at least two thread warps, and a thread warp is a set of threads including at least two GPU threads. Generally, a thread warp includes 32 GPU threads.

The kernel status register table 1012 is used to store information about each kernel program that does not complete running.

The information about the kernel program includes a priority of the kernel program, a quantity of registers required for running the kernel program, shared memory space required for running the kernel program, and a quantity of undistributed thread blocks in the kernel program.

The SM status register table 1013 is used to store a quantity of current remaining resources of each SM 102 and a highest priority of a thread block in each SM.

The quantity of current remaining resources of each SM 102 includes a quantity of remaining registers, a quantity of remaining hardware warps, and remaining shared memory space.

The SM 102 is configured to run the kernel program distributed by the global scheduler 101.

The SM logic controller 1021 is configured to distribute, according to the thread block status register table, a thread warp from a thread block to a hardware warp for running.

The thread block status register table 1022 is used to store a running status of each thread block.

The running status of the thread block includes a priority of the thread block, a number of a kernel to which the thread block belongs, a number of the thread block in the kernel, a quantity of registers required for and shared memory space required for a not-running part in the thread block, and a quantity of undistributed thread warps in the thread block.

Figure 2:
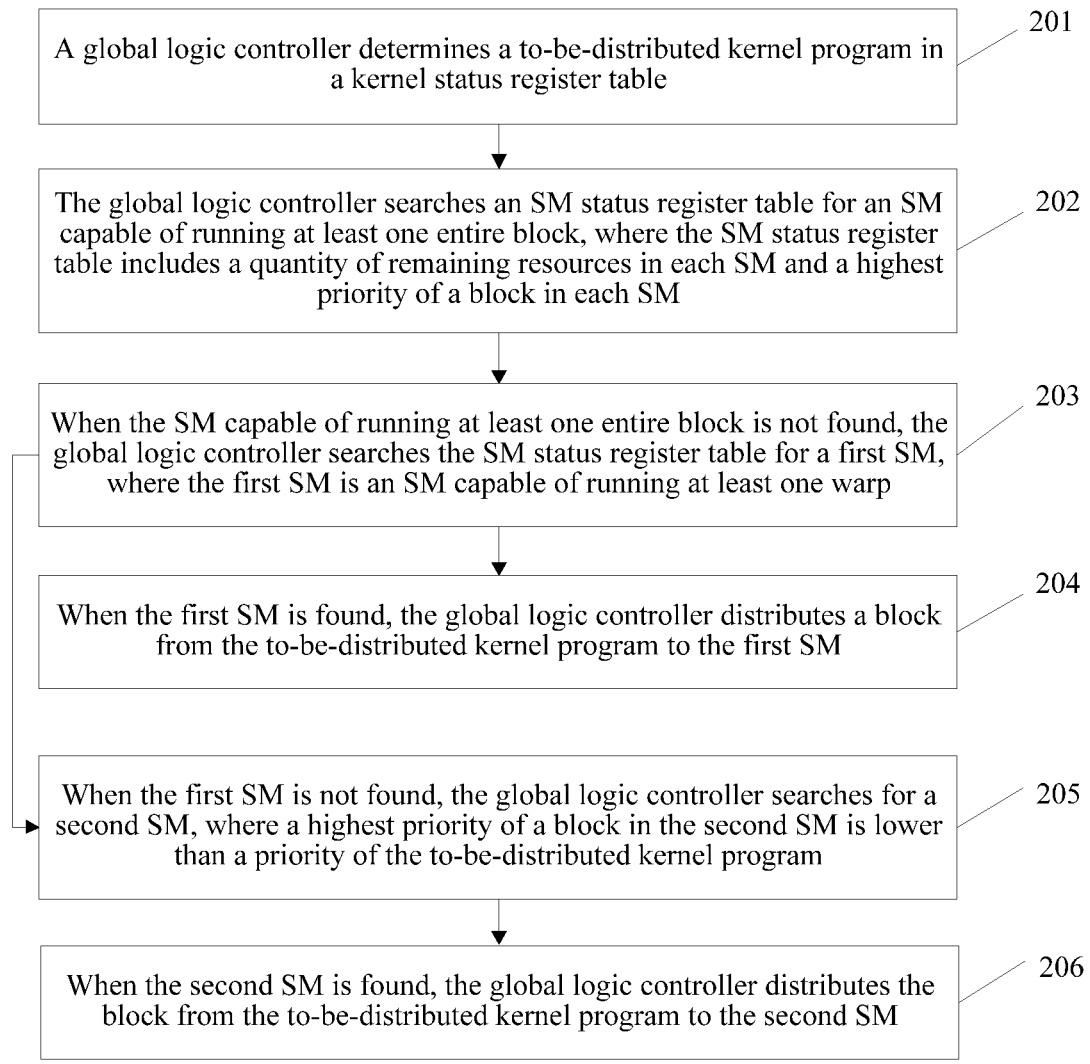
FIG. 2 is a flowchart of a GPU resource allocation method according to an embodiment of the present invention.

To increase a response speed of a kernel program having a high priority, an embodiments of the present invention provides a GPU resource allocation method. The method is applied to a GPU resource allocation system shown in FIG. 1. As shown in FIG. 2, the method includes the following operations.

201: A global logic controller determines a to-be-distributed kernel program in a kernel status register table.

The kernel status register table includes a priority of each kernel program that does not complete running and a quantity of undistributed thread blocks in each kernel program that does not complete running, and the to-be-distributed kernel program is a kernel program whose priority is highest in the kernel status register table and in which a quantity of undistributed thread blocks is not zero.

202: The global logic controller searches an SM status register table for an SM capable of running at least one entire thread block, where the SM status register table includes a quantity of remaining resources in each SM and a highest priority of a thread block in each SM.

The SM status register table includes a quantity of remaining registers, a quantity of remaining hardware warps, and remaining shared memory space of each SM, and a highest priority of a thread block in each SM. A priority of a thread block is the same as a priority of a kernel to which the thread block belongs.

It should be noted that an SM may include multiple thread blocks that do not complete running, and these thread blocks belong to a same kernel program or different kernel programs. To properly distribute the thread blocks, the global logic controller needs to determine a priority of each thread block in a same SM, so as to determine a highest priority in these thread blocks; and then stores, in the SM status register table, the highest priority of the thread block in the SM.

The SM capable of running at least one entire thread block is an SM in which a quantity of remaining registers is greater than a quantity of registers required for running a thread block, in which a quantity of remaining hardware warps is greater than a quantity of hardware warps required for running a thread block, and in which remaining shared memory space is greater than shared memory space required for running a thread block.

For example, assuming that a 36-KB register is required for running a thread block but there is only a 20-KB register left in an SM, the SM cannot run the thread block.

203: When the SM capable of running at least one entire thread block is not found, the global logic controller searches the SM status register table for a first SM, where the first SM is an SM capable of running at least one thread warp.

It may be understood that the first SM is an SM in which a quantity of remaining registers is greater than a quantity of registers required for running a thread warp, in which a quantity of remaining hardware warps is greater than a quantity of hardware warps required for running a thread warp, and in which remaining shared memory space is greater than shared memory space required for running a thread warp.

It should be noted that when a 36-KB register is required for running a thread block but there is only a 12-KB register remaining in an SM having most remaining resources, the global logic controller cannot find the SM capable of running at least one thread block. However, only a 6-KB register is required for running a thread warp. In this case, the SM of the remaining 12-KB register may run two thread warps, that is, the global logic controller can find the first SM.

204: When the first SM is found, the global logic controller distributes a thread block from the to-be-distributed kernel program to the first SM.

If remaining resources of the first SM can run only one thread warp, after the thread block in the to-be-distributed kernel program is distributed to the first SM, the first SM runs thread warps in the thread block one by one.

205: When the first SM is not found, the global logic controller searches for a second SM, where a highest priority of a thread block in the second SM is lower than a priority of the to-be-distributed kernel program.

206: When the second SM is found, the global logic controller distributes the thread block from the to-be-distributed kernel program to the second SM.

It should be noted that to prevent the thread block in the current determined to-be-distributed kernel program preempting a resource occupied by a running kernel program having a higher priority in SMs, a quantity of undistributed thread blocks in the kernel program having the higher priority is zero but a distributed thread block does not complete running. When the SM capable of running one thread warp is not found, the global logic controller needs to compare the highest priority of the thread block in each SM stored in the SM status register table with the priority of the to-be-distributed kernel program determined in step 201; determines that the SM for which the highest priority of the thread block in the SM is lower than the priority of the to-be-distributed kernel program is the second SM; and then distributes the thread block from the to-be-distributed kernel program to the second SM.

In addition, it should be noted that there is at least one second SM; and when remaining resources in the second SM are insufficient for running a thread warp, the thread block in the to-be-distributed kernel program is still distributed to the second SM, so as to reduce a waiting time for thread block distribution. After the thread block in the to-be-distributed kernel program is distributed to the second SM, when the second SM has a thread warp that has completed running, the second SM may start to run the thread block in the to-be-distributed kernel program.

In the GPU resource allocation method provided in this embodiment of the present invention, a global logic controller determines a to-be-distributed kernel program in a kernel status register table; searches an SM status register table for an SM capable of running at least one entire thread block; when the SM capable of running at least one thread block is not found, continues to search for a first SM capable of running at least one thread warp and distributes a thread block from the to-be-distributed kernel program to the first SM; and when the first SM is not found, distributes the thread block from the to-be-distributed kernel program to a second SM. In the prior art, only when a GPU has an idle SM, a thread block in a kernel program having a high priority can be distributed to the SM. Consequently, the kernel program having the high priority is not responded to in a timely manner. By comparison, in this embodiment of the present invention, when an SM capable of running at least one thread block is not found, a first SM capable of running at least one thread warp is searched for instead of waiting for another kernel program to release resources. Because the thread warp is smaller than the thread block, completion of running of the thread warp is faster than completion of running of the thread block, and the SM capable of running at least one thread warp is found more easily. After the SM capable of running at least one thread warp is found, a thread block in a to-be-distributed kernel program may be distributed to the first SM without waiting for a kernel program having a low priority to complete running a thread block. Alternatively, when the first SM capable of running at least one thread warp is not found, the thread block in the to-be-distributed kernel program is distributed to a second SM, thereby shortening a waiting time for thread block distribution and increasing a response speed of the kernel program having the high priority.

Figure 3:
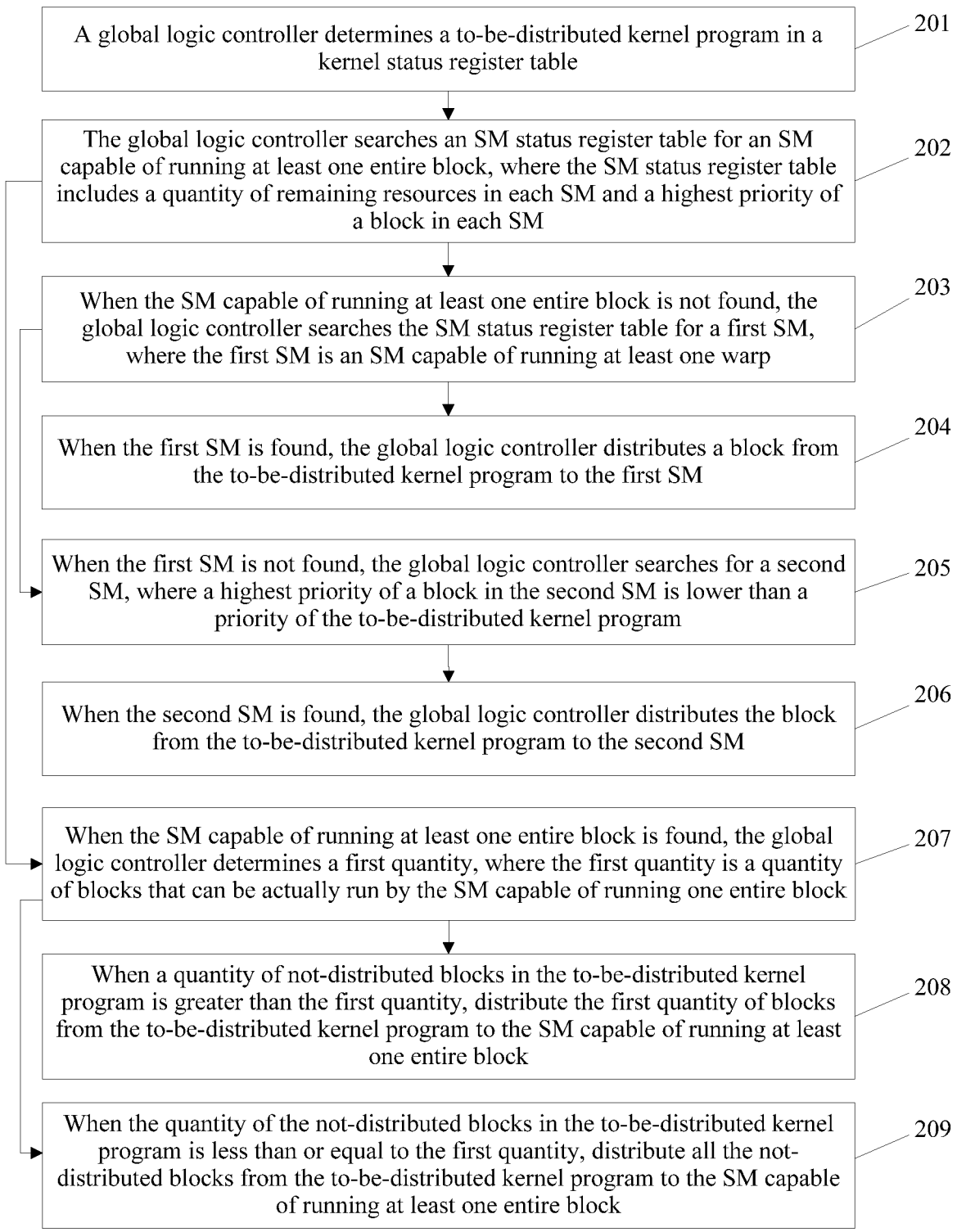
FIG. 3 is a flowchart of another GPU resource allocation method according to an embodiment of the present invention.

As a supplement to the foregoing embodiment, in another implementation manner provided in this embodiment of the present invention, as shown in FIG. 3, after the foregoing step 202 in which the global logic controller searches the SM status register table for the SM capable of running at least one entire thread block, if the SM capable of running at least one entire thread block is found, the following operations 207 to 209 are performed.

207: When the SM capable of running at least one entire thread block is found, the global logic controller determines a first quantity, where the first quantity is a quantity of thread blocks that can be actually run by the SM capable of running at least one entire thread block.

The first quantity is determined by the global logic controller by using an SM status register table including the SM capable of running at least one entire thread block. The global logic controller can calculate, according to a quantity of remaining resources of the SM that is stored in the SM status register table and a quantity of resources required for running a thread block, the quantity of thread blocks that can be actually run by the SM.

208: When a quantity of undistributed thread blocks in the to-be-distributed kernel program is greater than the first quantity, distribute the first quantity of thread blocks from the to-be-distributed kernel program to the SM capable of running at least one entire thread block.

The kernel status register table further includes a quantity of undistributed thread blocks in each kernel that does not complete running.

It should be noted that when the quantity of the undistributed thread blocks in the to-be-distributed kernel program is greater than the first quantity, it indicates that found remaining resources of the SM are insufficient for running the undistributed thread blocks in the to-be-distributed kernel program, so that the first quantity of thread blocks are distributed to the SM first, and after a thread block has completed running and a resource in the SM is released, a remaining thread block in the kernel is distributed to the SM.

209: When the quantity of the undistributed thread blocks in the to-be-distributed kernel program is less than or equal to the first quantity, distribute all the undistributed thread blocks from the to-be-distributed kernel program to the SM capable of running at least one entire thread block.

It should be noted that after the global logic controller distributes the thread block to the SM in the foregoing operations 204, 206, 208, and 209, the quantity of the undistributed thread blocks in the to-be-distributed kernel program in a kernel status register needs to be updated.

In the GPU resource allocation method provided in this embodiment of the present invention, when a global logic controller finds an SM capable of running at least one thread block, the global logic controller determines a first quantity; and when a quantity of undistributed thread blocks in a to-be-distributed kernel program is greater than the first quantity, the global logic controller distributes the first quantity of thread blocks from the to-be-distributed kernel program to the SM capable of running at least one entire thread block; or when a quantity of undistributed thread blocks in a to-be-distributed kernel program is less than or equal to the first quantity, the global logic controller distributes all the thread blocks from the to-be-distributed kernel program to the SM capable of running at least one entire thread block. When the SM running at least one thread block can be found, as many thread blocks as possible in the to-be-distributed kernel are distributed to the SM, so as to enable the to-be-distributed kernel to be responded to in a timely manner, thereby improving a response speed of a kernel program having a high priority.

Figure 4:
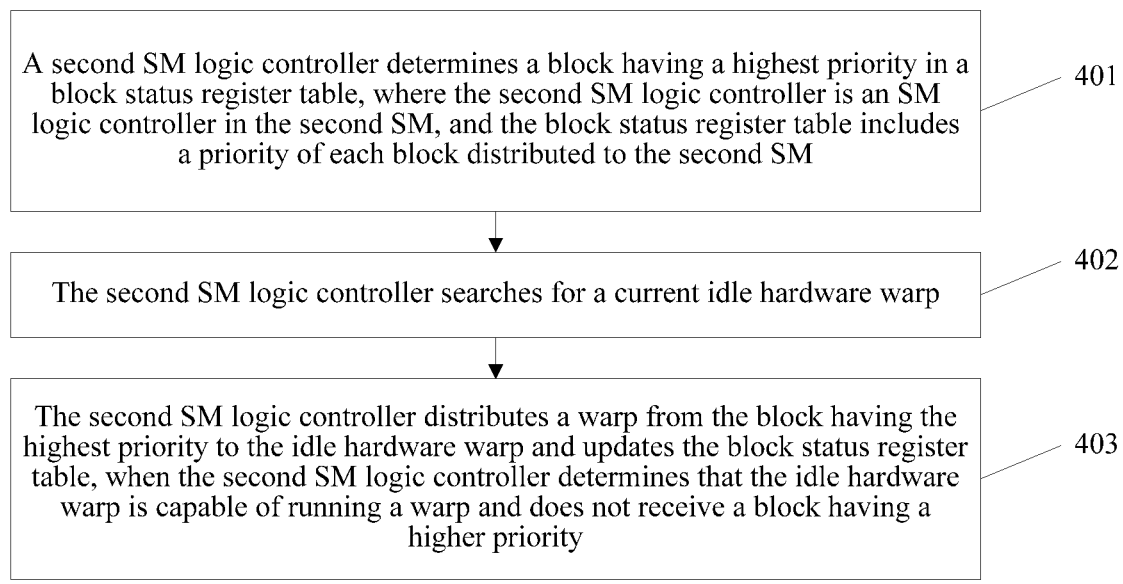
FIG. 4 is a flowchart of another GPU resource allocation method according to an embodiment of the present invention.

After the global logic controller distributes the thread block to the SM, the SM needs to properly distribute a thread warp in the thread block for running, so that another embodiment of the present invention provides a method for distributing a thread warp by the second SM logic controller after step 206 in which when the second SM is found, the global logic controller distributes the thread block from the to-be-distributed kernel program to the second SM. As shown in FIG. 4, the method includes the following operations.

401: The second SM logic controller determines a thread block having a highest priority in a thread block status register table, where the second SM logic controller is an SM logic controller in the second SM, and the thread block status register table includes a priority of each thread block distributed to the second SM.

With reference to the GPU resource allocation system shown in FIG. 1, the global logic controller is connected to at least two SMs. After the global logic controller distributes the thread block from the to-be-distributed kernel program to the second SM, the second SM logic controller in the second SM needs to distribute a thread warp in the thread block to a hardware warp for running.

Because a thread block of another kernel program is also running in the second SM, or there is a thread block in another kernel program waiting for running, the second SM logic controller needs to determine the thread block having the highest priority in the thread block status register table and preferentially runs a thread warp in the thread block having the highest priority.

It should be noted that a priority of a thread block stored in a thread block status register is a priority of a kernel to which the thread block belongs, and priorities of thread blocks in a same kernel are the same.

402: The second SM logic controller searches for a current idle hardware warp.

It should be noted that when the idle hardware warp is found, the second SM logic controller performs the following step 403; or when the idle hardware warp is not found, the second SM logic controller repeats the search action until the idle hardware warp is found and then continues to perform the following step 403.

Because a kernel program having a low priority is also running in the second SM, when there is a thread warp that has completed running in the kernel program having the low priority, a hardware warp recovers to an idle state. In this case, the second SM logic controller can find the idle hardware warp, and a thread warp in a kernel program having a high priority may occupy the hardware warp.

403: The second SM logic controller distribute a thread warp from the thread block having the highest priority to the idle hardware warp and updates the thread block status register table, when the second SM logic controller determines that the idle hardware warp is capable of running a thread warp and does not receive a thread block having a higher priority.

A method for determining whether the idle hardware warp is capable of running a thread warp is: determining whether a quantity of registers in the second SM is sufficient for running a thread warp; if the quantity of the registers in the second SM is sufficient for running a thread warp and the second SM does not receive a thread block having a higher priority, distributing a thread warp from a thread block having a highest priority to the found idle hardware warp; and if the quantity of the registers in the second SM is insufficient for running a thread warp, waiting until a thread warp has completed running and the quantity of the registers is sufficient for running a thread warp, and then distributing a thread warp to the idle hardware warp.

It should be noted that after a thread warp in the thread block having the highest priority is distributed to the idle hardware warp, whether the distribution of the thread block having the highest priority is completed further needs to be determined; if yes, the foregoing operations 401 to 403 are performed again; and if not, the foregoing operations 402 and 403 are performed again.

It should be noted that after the foregoing step 205 in which when the first SM is found, the global logic controller distributes the thread block from the to-be-distributed kernel program to the first SM, a method for distributing a thread warp by an SM logic controller of the first SM is the same as the method for distributing a thread warp by the second SM logic controller, and details are not described herein again.

In the GPU resource allocation method provided in this embodiment of the present invention, a second SM logic controller searches for an idle hardware warp first, and when the idle hardware warp is found and a second SM is capable of running a thread warp, a thread warp in a thread block having a highest priority is distributed to the hardware warp for running, instead of distributing the entire thread block to the hardware warp for running after the second SM has resources capable of running the entire thread block, thereby shortening a waiting time and improving a response speed of a kernel program having a high priority.

Figure 5:
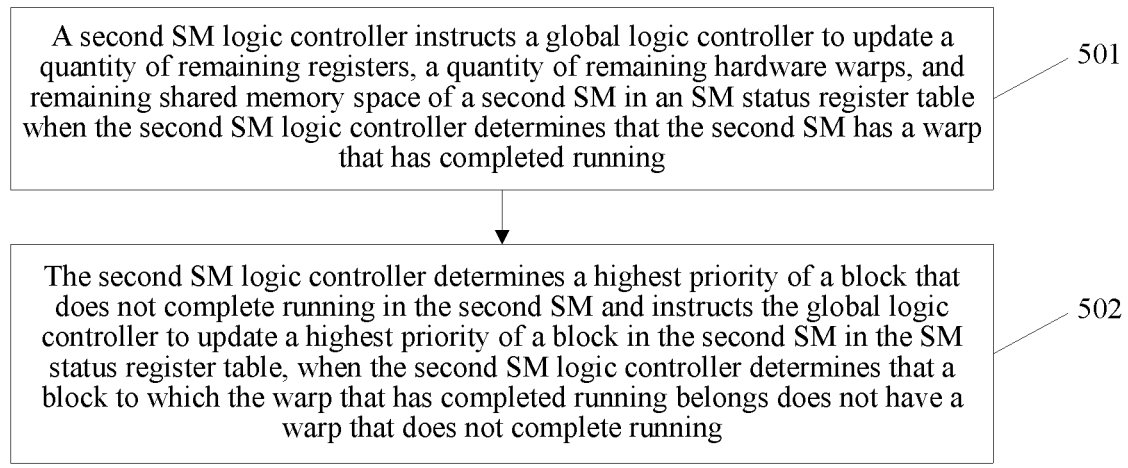
FIG. 5 is a flowchart of another GPU resource allocation method according to an embodiment of the present invention.

To reduce idle resources in an SM and improve resource utilization of the SM, so as to increase a response speed of a kernel program having a high priority, in another implementation manner provided in this embodiment of the present invention, as shown in FIG. 5, the method further includes the following operations.

501: The second SM logic controller instructs the global logic controller to update a quantity of remaining registers, a quantity of remaining hardware warps, and remaining shared memory space of the second SM in the SM status register table when the second SM logic controller determines that the second SM has a thread warp that has completed running.

It may be understood that because registers, hardware warps, and shared memory required for running a thread warp are all released when the thread warp has completed running, the quantity of remaining registers, the quantity of remaining hardware warps, and the remaining shared memory space of the second SM in the SM status register table need to be updated in real time, so that the global logic controller delivers a thread block to the SM in a timely manner.

502: The second SM logic controller determines a highest priority of a thread block that does not complete running in the second SM and instructs the global logic controller to update a highest priority of a thread block in the second SM in the SM status register table, when the second SM logic controller determines that a thread block to which the thread warp that has completed running belongs does not have a thread warp that does not complete running.

It should be noted that when a thread warp that does not complete running still exists in the thread block to which the thread warp that has completed running belongs, the second SM performs step 501 after the next thread warp has completed running.

In the GPU resource allocation method provided in this embodiment of the present invention, a second logic controller instructs a global logic controller to update an SM status register table and instructs the global logic controller to update a highest priority of a thread block in a second SM in the SM status register table in a timely manner, when the second logic controller determines that a thread warp that has completed running exists, so that the global logic controller may deliver a thread block from a kernel having a high priority to the SM in a timely manner according to the updated SM status register table, thereby improving resource utilization of the SM and increasing a response speed of the kernel program having a high priority.

Figure 6:
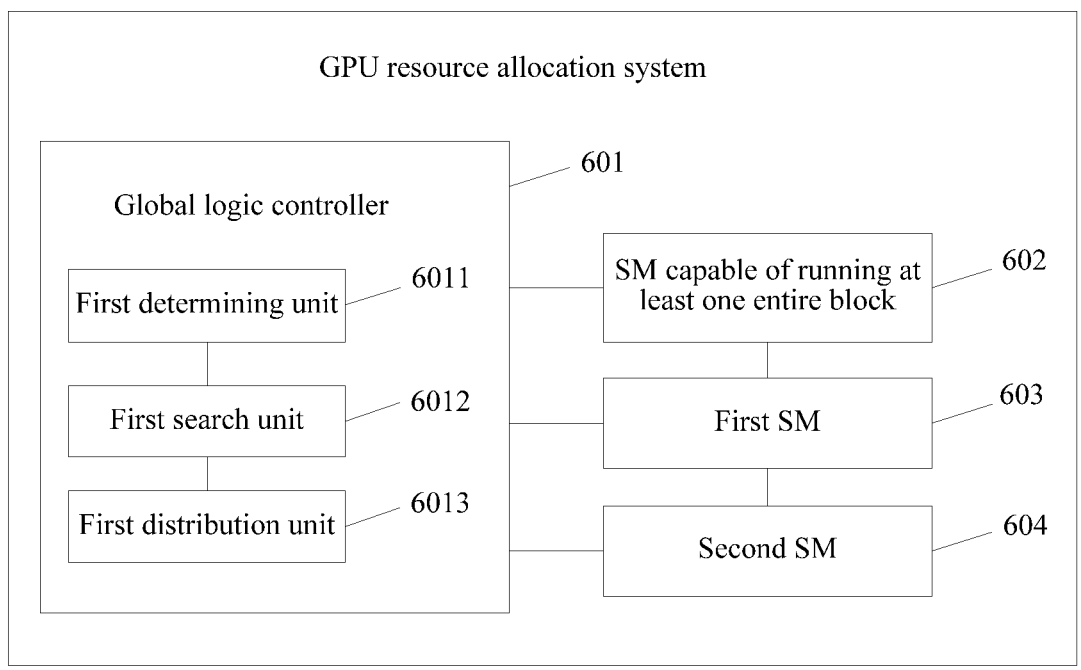
FIG. 6 is a schematic diagram of a logical structure of another GPU resource allocation system according to an embodiment of the present invention.

With reference to the GPU resource allocation methods shown in FIG. 2 to FIG. 5, an embodiment of the present invention further provides a GPU resource allocation system. As shown in FIG. 6, the system includes a global logic controller 601 and at least two streaming multiprocessors SMs capable of communicating with the global logic controller 601, and the global logic controller includes: a first determining unit 6011, a first search unit 6012, and a first distribution unit 6013.

It should be noted that the SM in the system may be an SM 602 capable of running at least one entire thread block, a first SM 603, or a second SM 604.

The first SM 603 is an SM capable of running at least one thread warp, and a highest priority of a thread block in the second SM is lower than a priority of a to-be-distributed kernel program. The to-be-distributed kernel program is a kernel program whose priority is highest in a kernel status register table and in which a quantity of undistributed thread blocks is not zero.

FIG. 6 shows the SM 602 capable of running at least one entire thread block, the first SM 603, and the second SM 604. Because the three SMs are determined according to quantities of remaining resources in the SMs, there is a case in which the three SMs may not exist at the same time. In addition, a quantity of SMs in the system is not limited to the three shown in FIG. 6.

The first determining unit 6011 is configured to determine the to-be-distributed kernel program in the kernel status register table, where the kernel status register table includes a priority of each kernel program that does not complete running and a quantity of undistributed thread blocks in each kernel program that does not complete running.

The first search unit 6012 is configured to: search an SM status register table for the SM 602 capable of running at least one entire thread block, where the SM status register table includes a quantity of remaining resources in each SM and a highest priority of a thread block in each SM; and when the SM 602 capable of running at least one entire thread block is not found, search the SM status register table for the first SM 603.

The first distribution unit 6013 is configured to: when the first search unit 6012 finds the first SM 603, distribute the thread block from the to-be-distributed kernel program to the first SM 603.

The first SM 603 is configured to run the thread block that is from the to-be-distributed kernel program and that is distributed by the first distribution unit 6013.

The first search unit 6012 is further configured to: when the first SM 603 is not found, search for the second SM 604.

The first distribution unit 6013 is further configured to: when the first search unit 6012 finds the second SM 604, distribute the thread block from the to-be-distributed kernel program to the second SM 604.

The second SM 604 is configured to run the thread block that is from the to-be-distributed kernel program and that is distributed by the first distribution unit 6013.

In another embodiment of the present invention, the first determining unit 6011 is further configured to: when the first search unit 6012 finds the SM capable of running at least one entire thread block, determine a first quantity, where the first quantity is a quantity of thread blocks that can be actually run by the SM capable of running at least one entire thread block.

The first distribution unit 6013 is further configured to: when the quantity of the undistributed thread blocks in the to-be-distributed kernel program is greater than the first quantity, distribute the first quantity of thread blocks from the to-be-distributed kernel program to the SM 602 capable of running at least one entire thread block; or when the quantity of the undistributed thread blocks in the to-be-distributed kernel program is less than or equal to the first quantity, distribute all the undistributed thread blocks from the to-be-distributed kernel program to the SM 602 capable of running at least one entire thread block.

The SM 602 capable of running at least one entire thread block is configured to run the thread block that is from the to-be-distributed kernel program and that is distributed by the first distribution unit 6013.

Figure 7:
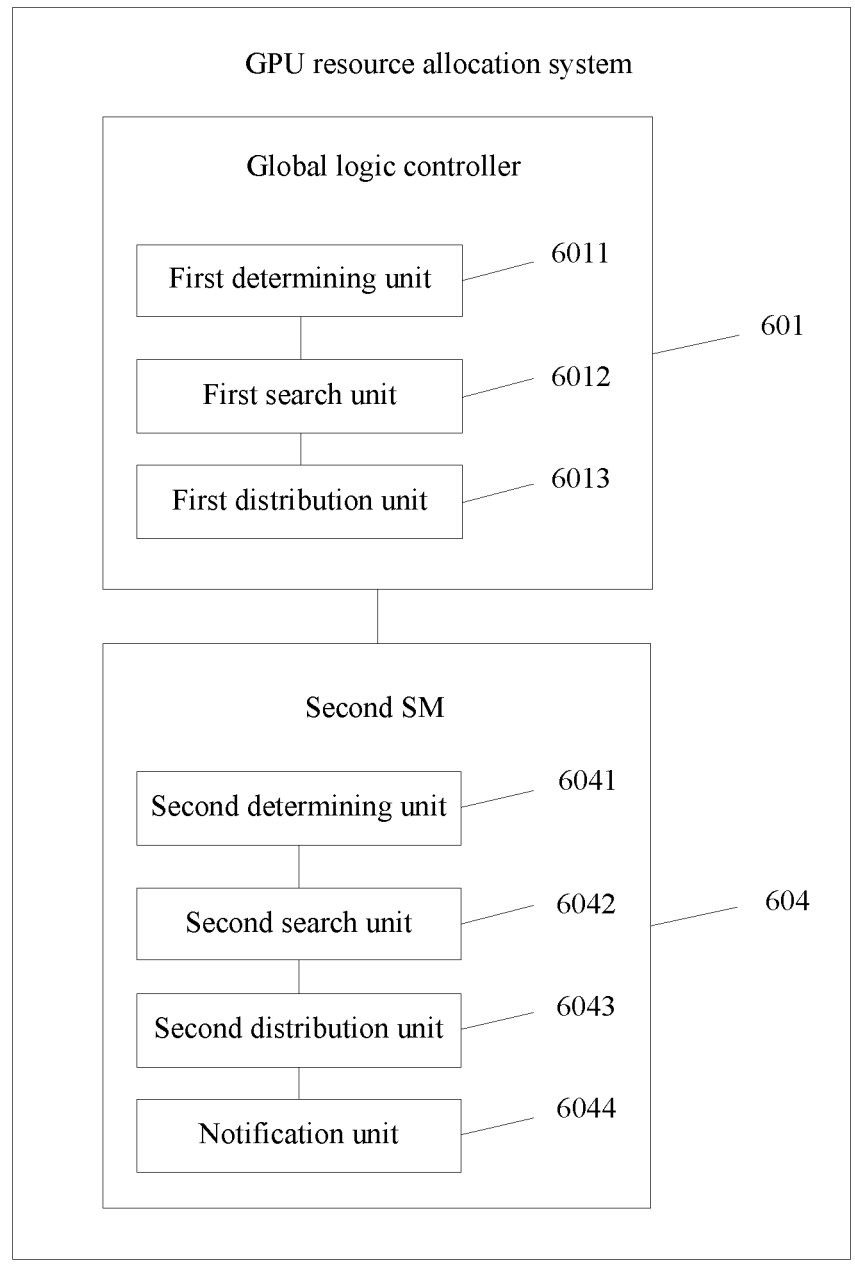
FIG. 7 is a schematic diagram of a logical structure of another GPU resource allocation system according to an embodiment of the present invention.

In another embodiment of the present invention, as shown in FIG. 7, the second SM 604 includes a second determining unit 6041, a second search unit 6042, a second distribution unit 6043, and a notification unit 6044.

It should be noted that the second determining unit 6041, the second search unit 6042, the second distribution unit 6043, and the notification unit 6044 are located in a second SM logic controller of the second SM 604.

The second determining unit 6041 is configured to determine a thread block having a highest priority in a thread block status register table, where the thread block status register table includes a priority of each thread block distributed to the second SM 604.

The second search unit 6042 is configured to search for a current idle hardware warp.

The second distribution unit 6043 is configured to: when it is determined that the idle hardware warp is capable of running a thread warp and a thread block having a higher priority is not received, distribute a thread warp from the thread block having the highest priority to the idle hardware warp.

It should be noted that compositional structures of the SM 602 capable of running at least one entire thread block, the first SM 603, and the second SM 604 are the same, and are not described separately in this embodiment of the present invention.

It should be noted that the SM status register table includes a quantity of remaining registers, a quantity of remaining hardware warps, and remaining shared memory space of each SM, and the first SM 603 is an SM in which a quantity of remaining registers is greater than a quantity of registers required for running a thread warp, in which a quantity of remaining hardware warps is greater than a quantity of hardware warps required for running a thread warp, and in which remaining shared memory space is greater than shared memory space required for running a thread warp.

The notification unit 6044 is configured to: when it is determined that the second SM 604 has a thread warp that has completed running, instruct the global logic controller to update the quantity of remaining registers, the quantity of remaining thread warps, and the remaining shared memory space of the second SM 604; and when it is determined that a thread block to which the thread warp that has completed running belongs does not have a thread warp that does not complete running, determine a highest priority of a thread block that does not complete running in the second SM 604 and instruct the global logic controller 601 to update the highest priority of the thread block in the second SM 604 in the SM status register table.

In the GPU resource allocation system provided in this embodiment of the present invention, the first determining unit in the global logic controller determines a to-be-distributed kernel program in a kernel status register table; the first search unit searches an SM status register table for an SM capable of running at least one entire thread block, and when the SM capable of running at least one thread block is not found, continues to search for a first SM capable of running at least one thread warp; and the first distribution unit distributes a thread block from the to-be-distributed kernel program to the first SM, and when the first SM is not found, distributes the thread block from the to-be-distributed kernel program to a second SM. In the prior art, only when a GPU has an idle SM, a thread block in a kernel program having a high priority can be distributed to the SM. Consequently, the kernel program having the high priority is not responded to in a timely manner. By comparison, in this embodiment of the present invention, when an SM capable of running at least one thread block is not found, a first SM capable of running at least one thread warp is searched for instead of waiting for another kernel program to release resources. Because the thread warp is smaller than the thread block, completion of running of the thread warp is faster than completion of running of the thread block, and the SM capable of running at least one thread warp is found more easily. After the SM capable of running at least one thread warp is found, a thread block in a to-be-distributed kernel program may be distributed to the first SM without waiting for a kernel program having a low priority to complete running a thread block. Alternatively, when the first SM capable of running at least one thread warp is not found, the thread block in the to-be-distributed kernel program is distributed to a second SM, thereby shortening a waiting time for thread block distribution and increasing a response speed of the kernel program having the high priority.

Figure 8:
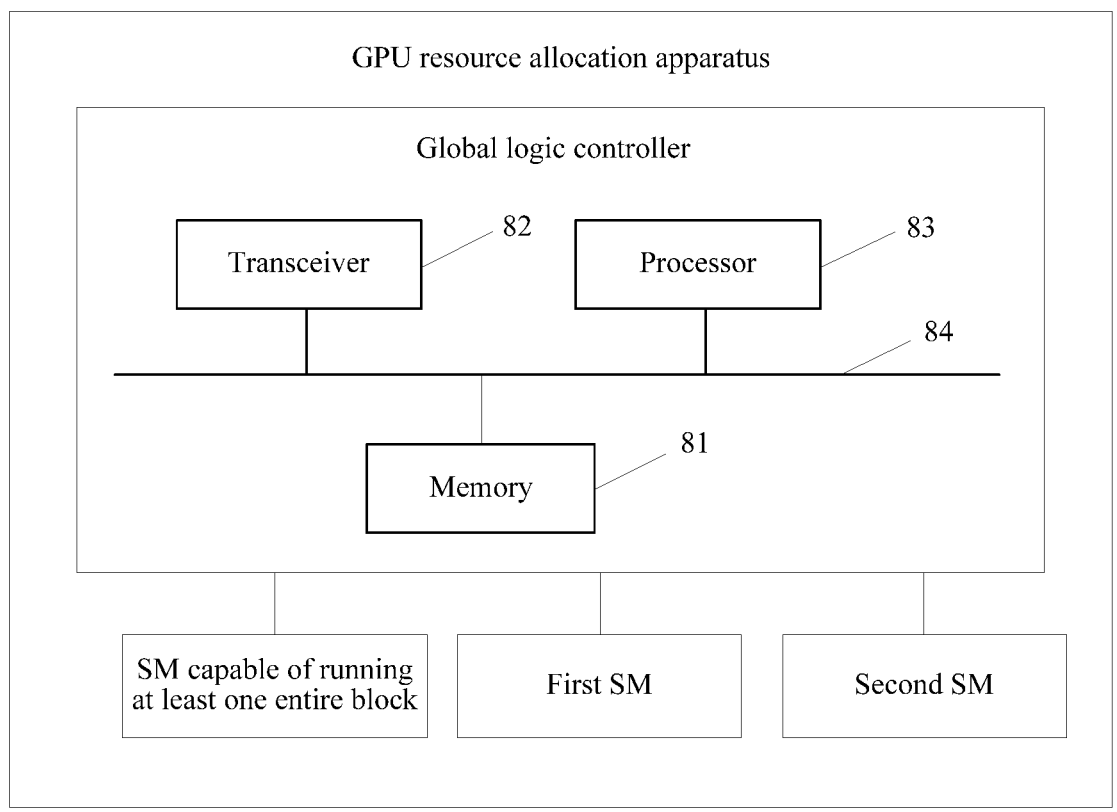
FIG. 8 is a schematic diagram of a logical structure of a GPU resource allocation apparatus according to an embodiment of the present invention.

An embodiment of the present invention further provides a GPU resource allocation apparatus. As shown in FIG. 8, the apparatus includes a global logic controller and at least two SMs capable of communicating with the global logic controller. The SM may be an SM capable of running at least one entire thread block or a first SM. The global logic controller may include a memory 81, a transceiver 82, a processor 83, and a bus 84. The memory 81, the transceiver 82 and the processor 83 are in communication connection with each other by using the bus 84.

The memory 81 may be a read-only memory (ROM), a static storage device, a dynamic storage device, or a random access memory (RAM). The memory 81 may store an operating system and another application program. When implementing the technical solution provided in this embodiment of the present invention by means of software or firmware, program code for implementing the technical solution provided in this embodiment of the present invention is stored in the memory 81 and is executed by the processor 83.

The transceiver 82 is configured to perform communication between the apparatus and another device or communications network (for example, but not limited to, the Ethernet, a radio access network (RAN), and a wireless local area network (WLAN)).

The processor 83 may be a general central processing unit (CPU), a microprocessor, an application-specific integrated circuit (ASIC), or one or more integrated circuits, so as to execute a related program to implement the technical solution provided in this embodiment of the present invention.

The bus 84 may include a path that transfers information between various components (for example, the memory 81, the transceiver 82, and the processor 83) of the apparatus.

It should be noted that, although the hardware shown in FIG. 8 includes only the memory 81, the transceiver 82, the processor 83, and the bus 84, in a specific implementation process, a person skilled in the art should understand that the apparatus further includes another device that is essential for implementing normal running. In addition, a person skilled in the art should understand that according to a specific requirement, the apparatus may further include a hardware device for implementing another function.

Specifically, when the global logic controller shown in FIG. 8 is configured to implement the system shown in the embodiment in FIG. 6, the processor 83 in the apparatus is coupled to the memory 81 and the transceiver 82, is configured to control execution of program instructions, and is configured to: determine a to-be-distributed kernel program in a kernel status register table, where the kernel status register table includes a priority of each kernel program that does not complete running and a quantity of undistributed thread blocks in each kernel program that does not complete running, and the to-be-distributed kernel program is a kernel program whose priority is highest in the kernel status register table and in which a quantity of undistributed thread blocks is not zero; search an SM status register table for an SM capable of running at least one entire thread block, where the SM status register table includes a quantity of remaining resources in each SM and a highest priority of a thread block in each SM; and when the SM capable of running at least one entire thread block is not found, search the SM status register table for a first SM, where the first SM is an SM capable of running at least one thread warp.

The transceiver 82 is configured to: when the first SM is found, distribute the thread block from the to-be-distributed kernel program to the first SM.

The processor 83 is further configured to: when the first SM is not found, search for a second SM, where a highest priority of a thread block in the second SM is lower than the priority of the to-be-distributed kernel program.

The transceiver 82 is further configured to: when the second SM is found, distribute the thread block from the to-be-distributed kernel program to the second SM.

The memory 81 is further configured to store the kernel status register table and the SM status register table.

The processor 83 is further configured to: when the SM capable of running at least one entire thread block is found, determine a first quantity, where the first quantity is a quantity of thread blocks that can be actually run by the SM capable of running at least one entire thread block.

The first distribution unit 82 is further configured to: when the quantity of the undistributed thread blocks in the to-be-distributed kernel program is greater than the first quantity, distribute the first quantity of thread blocks from the to-be-distributed kernel program to the SM capable of running at least one entire thread block; or when the quantity of the undistributed thread blocks in the to-be-distributed kernel program is less than or equal to the first quantity, distribute all the undistributed thread blocks from the to-be-distributed kernel program to the SM capable of running at least one entire thread block.

Figure 9:
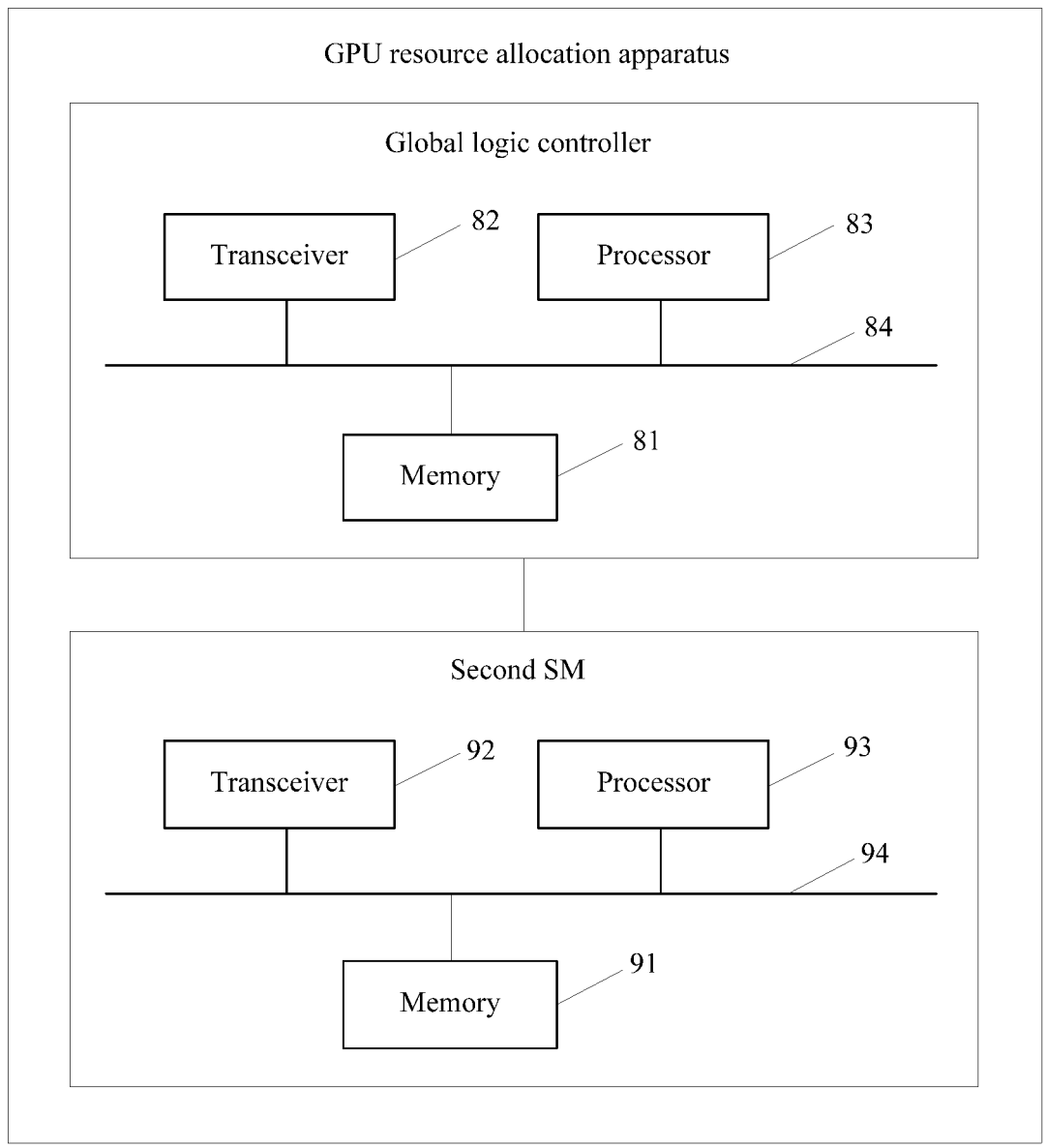
FIG. 9 is a schematic diagram of a logical structure of a GPU resource allocation apparatus according to an embodiment of the present invention.

In another embodiment of the present invention, as shown in FIG. 9, the second SM includes a memory 91, a transceiver 92, a processor 93, and a bus 94. The memory 91, the transceiver 92 and the processor 93 are in communication connection with each other by using the bus 94.

The memory 91 may be a read-only memory (ROM), a static storage device, a dynamic storage device, or a random access memory (RAM). The memory 91 may store an operating system and another application program. When implementing the technical solution provided in this embodiment of the present invention by means of software or firmware, program code for implementing the technical solution provided in this embodiment of the present invention is stored in the memory 91 and is executed by the processor 93.

The transceiver 92 is configured to perform communication between the apparatus and another device or communications network (for example, but not limited to, the Ethernet, a radio access network (RAN), and a wireless local area network (WLAN)).

The processor 93 may be a general central processing unit (CPU), a microprocessor, an application-specific integrated circuit (ASIC), or one or more integrated circuits, so as to execute a related program to implement the technical solution provided in this embodiment of the present invention.

The bus 94 may include a path that transfers information between various components (for example, the memory 91, the transceiver 92, and the processor 93) of the apparatus.

It should be noted that, although the hardware shown in FIG. 9 includes only the memory 91, the transceiver 92, the processor 93, and the bus 94, in a specific implementation process, a person skilled in the art should understand that the apparatus further includes another device that is essential for implementing normal running. In addition, a person skilled in the art should understand that according to a specific requirement, the apparatus may further include a hardware device for implementing another function.

Specifically, when the second SM shown in FIG. 9 is configured to implement the systems shown in the embodiments in FIG. 6 and FIG. 7, the processor 93 in the apparatus is coupled to the memory 91 and the transceiver 92, is configured to control execution of program instructions, and is configured to: determine a thread block having a highest priority in a thread block status register table, where the thread block status register table includes a priority of each thread block distributed to the second SM; and search for a current idle hardware warp.

The transceiver 92 is further configured to: when it is determined that the idle hardware warp is capable of running a thread warp and a thread block having a higher priority is not received, distribute a thread warp from the thread block having the highest priority to the idle hardware warp.

It should be noted that the SM status register table includes a quantity of remaining registers, a quantity of remaining hardware warps, and remaining shared memory space of each SM, and the first SM is an SM in which a quantity of remaining registers is greater than a quantity of registers required for running a thread warp, in which a quantity of remaining hardware warps is greater than a quantity of hardware warps required for running a thread warp, and in which remaining shared memory space is greater than shared memory space required for running a thread warp.

The transceiver 92 is further configured to: when it is determined that the second SM has a thread warp that has completed running, instruct the global logic controller to update the quantity of remaining registers, the quantity of remaining thread warps, and the remaining shared memory space of the second SM; and when it is determined that a thread block to which the thread warp that has completed running belongs does not have a thread warp that does not complete running, determine a highest priority of a thread block that does not complete running in the second SM and instruct the global logic controller to update the highest priority of the thread block in the second SM in the SM status register table.

In the GPU resource allocation apparatus provided in this embodiment of the present invention, the processor in the global logic controller determines a to-be-distributed kernel program in a kernel status register table; searches an SM status register table for an SM capable of running at least one entire thread block; and when the SM capable of running at least one thread block is not found, continues to search for a first SM capable of running at least one thread warp. The transceiver distributes a thread block from the to-be-distributed kernel program to the first SM; and when the first SM is not found, distributes the thread block from the to-be-distributed kernel program to a second SM. In the prior art, only when a GPU has an idle SM, a thread block in a kernel program having a high priority can be distributed to the SM. Consequently, the kernel program having the high priority is not responded to in a timely manner. By comparison, in this embodiment of the present invention, when an SM capable of running at least one thread block is not found, a first SM capable of running at least one thread warp is searched for instead of waiting for another kernel program to release resources. Because the thread warp is smaller than the thread block, completion of running of the thread warp is faster than completion of running of the thread block, and the SM capable of running at least one thread warp is found more easily. After the SM capable of running at least one thread warp is found, a thread block in a to-be-distributed kernel program may be distributed to the first SM without waiting for a kernel program having a low priority to complete running a thread block. Alternatively, when the first SM capable of running at least one thread warp is not found, the thread block in the to-be-distributed kernel program is distributed to a second SM, thereby shortening a waiting time for thread block distribution and increasing a response speed of the kernel program having the high priority.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A graphics processing unit (GPU) resource allocation method in a system comprising a global logic controller and at least two streaming multiprocessors (SMs) communicating with the global logic controller, the method comprising:

selecting, by the global logic controller, a target kernel program from a kernel status register table comprising a plurality of kernel programs, wherein the target kernel program comprising a highest priority among the plurality of kernel programs, and wherein the target kernel program comprises an undistributed thread block;

searching, by the global logic controller, in an SM status register table for a second SM unless a first SM executing at least one thread warp is found, wherein a highest priority of a highest priority thread block among thread blocks in the second SM is lower than a priority of the target kernel program; and distributing the undistributed thread block from the target kernel program to the second SM.

2. The GPU resource allocation method according to claim 1, wherein the method further comprises:

searching, by a second SM logic controller in the second SM, for a highest priority thread block in a thread block status register table that comprises a priority of each thread block distributed to the second SM;

searching, by the second SM logic controller, for a current idle hardware warp when the current idle hardware warp does not receive a thread block having a higher priority; and distributing a warp from the highest priority thread block to the current idle hardware warp.

3. The GPU resource allocation method according to claim 2, wherein the SM status register table comprises a quantity of remaining registers, a quantity of remaining hardware warps, and remaining shared memory space of each SM, and wherein the method further comprises:

instructing, by the second SM logic controller, the global logic controller to update the quantity of remaining registers, the quantity of remaining hardware warps, and the remaining shared memory space of the second SM;

determining, by the second SM logic controller, that the second SM comprises a completed warp that has completed executing;

determining, by the second SM logic controller, a highest priority among the thread blocks prior to completion of execution in the second SM; and instructing the global logic controller to update the highest priority of the thread block in the second SM in the SM status register table when the second SM logic controller does not determine that a thread block associated with the completed warp comprises another warp prior to completion of execution.

4. The GPU resource allocation method according to claim 2, wherein the thread block status register table stores a status of each thread block comprising a priority of each thread blocks, a kernel associated with each thread block, a quantity of registers, a shared memory space used for each thread block, and a quantity of undistributed thread warps in each thread block.

5. The GPU resource allocation method according to claim 1, wherein the target kernel program comprises at least two thread blocks, wherein each thread block comprises at least two thread warps, and wherein each thread warp comprises at least two GPU threads.

6. The GPU resource allocation method according to claim 1, wherein the SM status register table stores a quantity of remaining resources for each SM and a highest priority thread block for each SM.

7. A graphics processing unit (GPU) resource allocation method in a system including a global logic controller and at least two streaming multiprocessors (SMs) configured to communicate with the global logic controller, the method performed by the global logic controller comprising:

selecting a target kernel program from a kernel status register table comprising a plurality of kernel programs, wherein the target kernel program comprises a highest priority among the plurality of kernel programs, and wherein the target kernel program comprises a quantity of undistributed thread blocks;

searching in an SM status register table for an SM executing at least one entire thread block;

determining a first quantity of thread blocks that can be executed by the SM when the SM status register table is searched; and distributing the first quantity of thread blocks to the SM blocks from the quantity of undistributed thread blocks at the target kernel program when the quantity of undistributed thread blocks at the target kernel program is greater than the first quantity of thread blocks.

8. The GPU resource allocation method according to claim 7, wherein the target kernel program comprises at least two thread blocks, wherein each thread block comprises at least two thread warps, and wherein each thread warp comprises at least two GPU threads.

9. The GPU resource allocation method according to claim 7, wherein the SM status register table stores a quantity of remaining resources for each SM and a highest priority thread block for each SM.

10. A graphics processing unit (GPU) resource allocation system, comprising:

at least two streaming multiprocessors (SMs) comprising a first SM and a second SM; and a global logic controller in communication with the at least two SMs and configured to:

select a target kernel program from a kernel status register table comprising a plurality of kernel programs, wherein the target kernel program comprises a highest priority among the plurality of kernel programs, and wherein the target kernel program comprises an undistributed thread block;

search an SM status register table for the second SM unless the first SM executing at least one thread warp in the SM status register table is found, wherein a highest priority of a highest priority thread block among thread blocks in the second SM is lower than a priority of the target kernel program; and distribute the undistributed thread block from the target kernel program to the second SM.

11. The GPU resource allocation system according to claim 10, wherein the second SM comprises a second SM logic controller configured to:

search for a highest priority thread block in a thread block status register table that comprises a priority of each thread block distributed to the second SM;

search for a current idle hardware warp when the current idle hardware warp does not receive a thread block having a higher priority; and distribute a warp from the highest priority thread block to the current idle hardware warp.

12. The GPU resource allocation system according to claim 11, wherein the SM status register table comprises a quantity of remaining registers, a quantity of remaining hardware warps, and remaining shared memory space of each SM, and wherein the second SM logic controller is configured to:

instruct the global logic controller to update the quantity of remaining registers, the quantity of remaining hardware warps, and the remaining shared memory space of the second SM;

determine that the second SM comprises a completed warp that has completed executing;

determine a highest priority among the thread blocks prior to completion of execution in the second SM; and instruct the global logic controller to update the highest priority of the thread block in the second SM in the SM status register table when the second SM logic controller does not determine that a thread block associated with the completed warp comprises another warp prior to completion of execution.

13. The GPU resource allocation systems according to claim 11, wherein the thread block status register table stores a status of each thread block comprising a priority of each thread blocks, a kernel associated with each thread block, a quantity of registers, shared memory space used for each thread block, and a quantity of undistributed thread warps in each thread block.

14. The GPU resource allocation system according to claim 10, wherein the target kernel program comprises at least two thread blocks, wherein each thread block comprises at least two thread warps, and wherein each thread warp comprises at least two GPU threads.

15. The GPU resource allocation system according to claim 10, wherein the SM status register table stores a quantity of remaining resources for each SM and a highest priority thread block for each SM.

16. A graphics processing unit (GPU) resource allocation apparatus comprising:

a plurality of streaming multiprocessors (SMs); and a global logic controller configured to communicate with the SMs, wherein the global logic controller is configured to:

select a target kernel program from a kernel status register table comprising a plurality of kernel programs, wherein the target kernel program comprises a highest priority among the plurality of kernel programs, and wherein the target kernel program comprises a quantity of undistributed thread blocks;

search an SM status register table for an SM executing at least one entire thread block;

determine a first quantity of thread blocks that can be executed by the SM when the SM is searched; and distribute the first quantity of thread blocks to the SM from the quantity of undistributed thread blocks at the target kernel program when the quantity of undistributed thread blocks at the target kernel program is less than or equal to the first quantity of thread blocks.

17. The GPU resource allocation system according to claim 16, wherein the target kernel program comprises at least two thread blocks, wherein each thread block comprises at least two thread warps, and wherein each thread warp comprises at least two GPU threads.

18. The GPU resource allocation system according to claim 16, wherein the SM status register table stores a quantity of remaining resources for each SM and a highest priority thread block for each SM.

* * * * *